3,457,161
PROCESS FOR TREATMENT OF MINERAL OILS
Anthony J. Tulleners, Fullerton, Calif., assignor to Union Oil Company of California, Los Angeles, Calif., a corporation of California
Continuation-in-part of application Ser. No. 429,512, Feb. 1, 1965, now Patent No. 3,368,875. This application Oct. 2, 1967, Ser. No. 672,065
Int. Cl. C10g 13/00, 23/06
U.S. Cl. 208—111          10 Claims

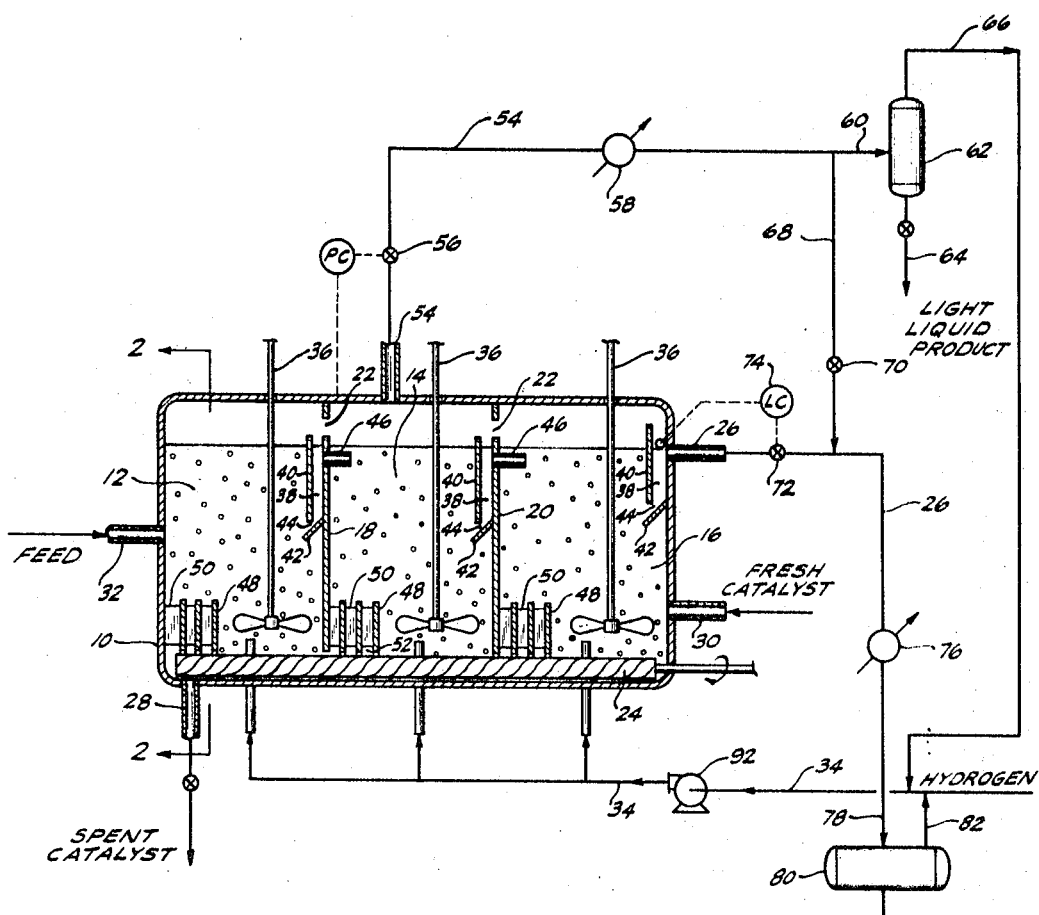
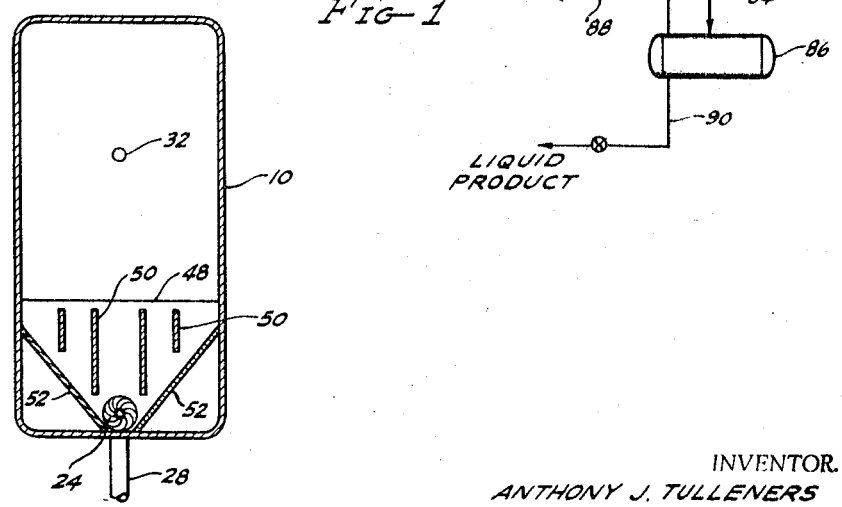
FIG-1
FIG-2
INVENTOR.
ANTHONY J. TULLENERS
BY
James S. Henderson
ATTORNEY United States Patent Office 3,457,161
Patented July 22, 1969

ABSTRACT OF THE DISCLOSURE

Mineral oils are hydrogenated (e.g. hydrofined and/or hydrocracked) in the liquid phase by passing the oil horizontally through a plurality of juxtaposed hydrogenation zones, while effecting a generally countercurrent, horizontal flow of powdered, suspended hydrogenation catalyst serially through said hydrogenation zone. Apparatus is also described, including means for transporting the catalyst serially through said zones, and for transferring catalyst-free oil from one zone to the next.

Related applications

This application is a continuation-in-part of application Ser. No. 429,512, filed Feb. 1, 1965, now U.S. Patent No. 3,368,875.

Background and summary of invention

In conventional systems used to hydrogenate and/or hydrotreat heavy mineral oils, the feedstock plus hydrogen is generally passed downwardly in mixed vapor-liquid phase through a bed of suitable granular or pelleted catalyst. In systems of this type, liquid by-passing and consequent inefficient catalyst utilization is quite common. Such liquid by-passing is particularly disadvantageous when attempting to eliminate a contaminant such as sulfur from the feedstock by hydrofining. When attempting to obtain molecular weight reduction or cracking of the feedstock, it is difficult to keep the liquid oil phase in contact with the catalyst for the optimum time without overexposing the liquid phase and, in certain instances, underexposing the light vapor phase. In such processes, satisfactory exposure of the vapor and liquid components of a mixed phase feed to the hydrotreating catalyst is very nearly impossile to obtain.

U.S. Patent No. 3,144,404 describes a hydrotreating process wherein a liquid feedstock is passed into one end of a horizontally elongated reaction zone containing a macro-pellet hydrotreating catalyst bed while introducing hydrogen into the lower portion of said bed. The feedstock flows in liquid phase in a generally horizontal direction through the stationary catalyst bed and is recovered at the opposite end thereof while the vaporous products produced by the reaction and excess hydrogen are recovered overhead. In this method overexposure of the light vaporous materials is substantially eliminated.

Difficulties are encountered in the aforedescribed patent process when heavy mineral oils are hydrotreated. In such cases, the interior surface areas of the catalyst pellets become relatively useless due to slow diffusion rates of the heavy feed molecules. As a result only a portion of the active catalyst surface area is effectively utilized. Moreover, the rate of catalyst deactivation is very rapid due to the absorption of coke-forming materials on interior catalyst surfaces where the supply of hydrogen is deficient due to the low diffusion rates of hydrogen through the liquid barrier. Because of this rapid deactivation and limited effective surface area of the catalyst, thermal cracking reactions become relatively more prominent, with resultant production of light gases and a relatively unsaturated and unstable product. When this occurs, the process must be discontinued while the catalyst is regenerated.

It is well known that problems of the nature described above can be minimized by employing a powdered catalyst suspended or slurried in the liquid feed, through which which hydrogen is bubbled. However, most of the known slurry contacting techniques are essentially batch type operations which must be shut down periodically to separate the treated oil from the catalyst, and/or to permit replacement of the catalyst as it becomes deactivated. Batch type operations are also inherently disadvantageous in that process conditions, particularly temperature, must be continuously adjusted during each run in order to compensate for catalyst deactivation and maintain the desired conversion.

Attempts have been made to provide continuous slurry type operations by intermittently withdrawing from the reaction zone a slip stream of the slurried catalyst and replacing the withdrawn portion with fresh catalyst. Major disadvantages in this procedure are that the withdrawn catalyst increments comprise mainly relatively fresh catalyst (due to the homogeneous distribution of catalyst in the reactant slurry), and the introduction of fresh catalyst into the system tends to bring about local overheating due to increased hydrogenation rates, with resultant accelerated catalyst deactivation rates.

I have now found that the aforementioned difficulties can be overcome by a novel procedure wherein a generally counter-current flow of feed and catalyst is maintained through a plurality of contacting zones, while still maintaining the bulk of the catalyst inventory in a suspended state by the agitating effect of hydrogen gas bubbling through the slurry in each reaction zone and/or by mechanical agitating means. By operating in this manner, feed oil moving through said zones progressively contacts more active hydrotreating catalyst; the withdrawn catalyst is in a substantially homogeneously deactivated state; and the fresh catalyst is introduced into contact only with feed which has already been extensively hydrogenated and thus is not capable of generating excessive exothermic heat, Moreover, thermal cracking is minimized because of the extended operative exterior surface area of the finely divided particulate catalyst.

In view of the foregoing, it is an overall objective of this invention to provide an apparatus and method for improving the efficiency of catalyst utilization, and to decrease the rate of catalyst deactivation, in liquid-vapor phase hydrogenation processes. A more specific object is to provide a novel method and apparatus for contacting liquid phase feed oil in a counter-current flow relationship with finely divided particulate catalyst. Other objects will be more apparent from the detailed description which follows.

The invention can perhaps be best understood with reference to the attached drawings.

FIGURE 1 shows in cross-section a suitable embodiment of the hydrotreating apparatus for use herein, and also schematically illustrates suitable associated product recovery means, hydrogen recycle means, and feed supply means.

FIGURE 2 is a sectional view of FIGURE 1 along line 2—2.

Referring now more particularly to FIGURE 1, an elongated pressure-retaining reaction vessel 10, suitably constructed of iron, steel, or other metal according to conventional design, is divided into a plurality of reaction zones 12, 14 and 16 by partitions 18 and 20. A passageway 22 for gaseous materials is provided at the top of each of partitions 18 and 20. While the reaction vessel 10 illustrated in FIGURE 1 shows only three reaction zones, the vessel can be constructed to contain any number of such zones. Catalyst conveyor means such as a helical screw conveyor 24 is positioned at the bottom of reaction vessel 10 and extends throughout its entire length. Each reaction zone is provided with separation means, as will be subsequently described, for separating liquid feed oil from finely divided catalyst and for transferring said separated feed oil to an adjacent reaction zone. The separation means in reaction zone 16 is associated with conduit 26 for removing treated product from reaction vessel 10. Each reaction zone is also provided with catalyst accumulation means, hereafter described, for directing particulate catalyst into contact with screw conveyor 24 whereupon it is transported to an adjacent reaction zone and ultimately out of reaction vessel 10 through catalyst outlet 28.

A suitable mode of operation of the apparatus of FIGURE 1 is as follows: Finely divided powdered catalyst is introduced into reactor vessel 10 via conduit 30 and is distributed throughout the entire length of the vessel by screw conveyor 24. The amount of catalyst to be employed can vary widely, depending upon the type of operation to be performed. It is contemplated that from about 1 to 60 percent and ordinarily 5 to 40 percent of the total volume of each contacting zone will be occupied by catalyst at its static gross bulk. The more catalyst employed, the greater will be the permissible feed oil throughput rate. Preferably the catalyst bed (at static gross bulk) in the reaction zones has an overal length over three times its height and most preferably, over five times its height.

With a catalyst charge in place, preheated feed oil, at least partially in liquid phase, is introduced into reaction vessel 10 via conduit 32 and hydrogen is introduced into the bottom of each of said reaction zones through hydrogen supply line 34. Liquid feed oil introduced into reaction vessel 10 moves through the entire length of said vessel progressively forming a substantially uniform ebullient slurry with particulate catalyst in reaction zones 12, 14 and 16 as it is mixed with stirrer 36.

According to another mode of operation preheated feed is first fed into the reactor at autogenous pressure, in the absence of hydrogen and catalyst. When the reactor is filled, sufficient hydrogen is introduced to raise the pressure to e.g. 200–600 p.s.i.g. Catalyst is then introduced through conduit 30 and distributed the length of the vessel by screw conveyor 24, before activating stirrers 36. By starting up the process in this manner, the initial "wild" activity of the fresh catalyst can be controlled by suitably adjusting the hydrogen pressure in the reactor. After the initial catalyst charge has been "broken in," and an equilibrium condition established in the reactor, hydrogen pressures can then be raised to the desired process level of e.g. 500–1000 p.s.i.g.

After the process has been suitably initiated as described above, liquid is continuously separated from the finely divided particulate catalyst in each reaction zone by separation means of the type shown in FIGURE 1 which comprises a setting zone 38, formed by means of a flat vertical baffle 40 having a straight bottom edge, and being affixed, as by continuous weldment, to opposite walls of reaction vessel 10. The lower extremity of settling zone 38 is defined by a sloping, flat solids-return baffle 42 welded to partition 18 and the opposite walls of reaction vessel 10. The lower edge of baffle 40 terminates a sufficient distance above the upper surface of baffle 42 to provide a straight horizontal aperture 44 of desired width, e.g., 0.01 to 2 inches. Liquid product is transferred from settling zone 38 to an adjacent reaction zone by means of outlet conduit 46 communicating therewith.

Settling zone 38 provides a substantially quiescent zone which allows the solid particulate catalyst to settle by gravity and be returned to the reaction zone via aperture 44. To maintain settling zone 38 in a substantially quiescent state, the hydrogen throughput rate in the reaction zones is controlled so that substantially no gas bubbles enter said settling zone 38. To minimize catalyst back-flow in conduit 46 and resulting mingling of feed oil with catalyst, conduit 46 may be filled with packed materials such as Alundum balls, glass beads, marble chips or similar packing materials to provide tortuous passageways with small cross-sectional areas so as to more effectively prevent flow of slurry catalyst into said conduit 46.

It will be apparent from the foregoing that the flow of feed through the several contacting zones, as well as the separation of catalyst in each zone from the feed to be transferred to the next zone, is achieved automatically, in hydrodynamic response to the introduction of fresh feed to feed inlet zone 12. But, as will be seen hereinafter, catalyst is transferred from zone to zone by externally driven mechanical means.

Powdered catalyst introduced into reaction vessel 10 via catalyst input line 30 also traverses the length of reaction vessel 10 during the process of my invention, but in a direction generally countercurrent to the flow of feed oil therethrough. In this manner, liquid feed oil being hydrotreated progressively contacts more active catalyst. By means of stirrers 36 and/or the hydrogen bubbling through the slurry, sufficient agitation is provided to maintain at least about 75–80% of the total catalyst inventory in a suspended state. A minor portion of the settled catalyst in each reaction zone is continuously or intermittently transferred to the next adjacent reaction zone by means of screw conveyor 24 and catalyst accumulation means, shown in detail in FIGURE 2.

The catalyst accumulation means, which are preferably located in a relatively quiescent portion of each reaction zone, comprise a series of vertical baffles 48 affixed to opposite walls of reaction vessel 10 and a series of vertical baffles 50 which traverse baffles 48 and lie in a direction essentially parallel to the elongated axis of said reaction vessel 10. The bottom of the accumulation means is defined by a flat solids-return plate 52 which slopes in a downward direction from the side walls of reaction vessel 10 towards screw conveyor 24. The lower edges of baffles 50 terminate a sufficient distance above the upper surface of plate 52 to provide horizontal apertures which allow solid catalyst to slide along the upper surface of plate 52 into contact with screw conveyor 24 and form a compact mass thereabout, thereby preventing flow of liquid between adjacent reaction zones through the passageway provided between said reaction zones for screw conveyor 24. Solid particulate catalyst is transferred by screw conveyor 24 from the accumulation means to an adjacent reaction zone, where it is again mixed with liquid material in said reaction zones to form a slurry. Screw conveyor 24 is rotated by conventional means not shown in the drawing.

The addition of fresh catalyst via conduit 30, and the withdrawal of spent catalyst via outlet 28, may be either continuous or intermittent, but in most cases intermittent addition and withdrawal at intervals of e.g. 1–24 hours is preferred.

Referring again to FIGURE 1, vaporized feed components plus hydrogen are continuously withdrawn from reaction vessel 10 via vapor outlet conduit 54, controlled by backpressure-regulated valve 56. The gaseous effluent in line 54 is cooled in condenser 58, and may then be transferred either via line 60 to gas-liquid separator 62 for separate recovery of light liquid product via line 64 and hydrogen, which is recycled via line 66, as will be subsequently described, or it may be diverted via line 68 and valve 70 to the liquid product recovery system to be hereinafter described.

Liquid product from reaction zone 16 is withdrawn via outlet conduit 26 and valve 72 in response to liquid level controller 74 which maintains the feed oil in reactor vessel 10 at a predetermined level 75. The liquid in line 26 is passed through cooler 76, and is transferred via line 78 to high-pressure separator 80 from which hydrogen recycle gas is withdrawn via line 82. Liquid product in separator 80 is withdrawn via line 84, and is flashed into low-pressure separator 86, from which light hydrocarbon gases, $H_2S$, etc., are withdrawn overhead via line 88, and liquid product is withdrawn via valve line 90 and sent to product fractionation equipment, not shown. Recycle hydrogen in line 66 is blended with fresh make-up hydrogen from line 34 and line 82, and the mixture is then returned to the reactor via compressor 92 and line 34.

The foregoing description of apparatus for use herein is not intended to be exhaustive; obviously many variations of such apparatus may be constructed which will achieve the same essential ends.

While the apparatus described above may be used to carry out a great variety of chemical and/or physical treatments of liquid feedstock, it is designed primarily to effect reactions commonly referred to as hydrofining and/or hydrocracking. Suitable feedstocks for such operations comprise gas oils, kerosene, jet fuels, fuel oils, cycle oils from other cracking operations, crude oils, crude oil residua, etc. It is preferred to employ feedstocks containing a substantial proportion, e.g. at least about 10 volume-percent, of materials boiling above 500° F., and even above 700° F.

The process is particularly advantageous for the hydrofining and/or hydrocracking of crude oils, topped crude oils or crude oil residua. As is well known, crude oil feeds normally contain metallic impurities such as vanadium, nickel and the like in the form of complex organometallic compounds which tend to deposit on the catalyst and bring about rapid deactivation. By virtue of the countercurrent operation in my process, the metallic components of the feed are selectively deposited on the relatively spent catalyst in the feed inlet contacting zone, thus leaving the catalyst in the downstream contacting zones relatively free of deactivating metallic deposits.

The hydrogenating catalyst used in the aforementioned treatments is in the form of finely subdivided particles of average diameter less than about 100 microns and preferably between about 0.01 and 20 microns. The catalyst generally comprises transitional metals, and specifically titanium, vanadium, chromium, manganese, iron, cobalt, nickel, copper, zinc, zirconium, molybdenum, ruthenium, rhodium, palladium, cadmium, tantalum, tungsten, iridium, platinum, etc. These metals may be employed in free form, or in the form of oxides, sulfides, sulfates, or other compounds. It is found in most cases that the sulfide form of the metal is preferred. The metals or their compounds may be employed singly or in admixture with one or more other metal components. A preferred class of metals comprises the Group VI-B and Group VIII metals, particularly combinations of one or more Group VI-B metals with one or more Group VIII metals.

The active hydrogenating component may be employed in substantially undiluted form, but may also be distended upon an adsorbent carrier in proportions ranging between about 0.5 and 50 percent by weight. Suitable carriers include in general the difficultly reducible adsorbent inorganic oxides, for example silica gel, alumina gel, mixtures of silica and alumina, zirconia, titania, magnesia, beryllia, etc. Various natural clays may also be employed after suitable activation by heat and/or acid treatment. Such clays include for example the various montmorillonite clays, e.g., bentonite.

The operation generally referred to as hydrofining is carried out to effect desulfurization, denitrogenation, deoxygenation, color improvement, or merely to effect hydrogenation of gum-forming olefins. Hydrofining is generally carried out at temperatures between about 500° F. and 850° F., and pressures between about 50 and 5,000 p.s.i.g. Liquid hourly space velocities (based upon the actual inventory volume of catalyst used at its static bulk density) may vary between about 1 and 100 volumes, preferably about 20 and 75 volumes, of liquid feed per volume of catalyst per hour. Preferred catalysts for hydrofining include particularly the combination of Group VI-B metal oxides or sulfides with Group VIII metal oxides or sulfides. Particularly desirable catalysts comprise cobalt sulfide and/or nickel sulfide plus molybdenum sulfide, or tungsten sulfide plus nickel sulfide, supported upon alumina or silica-stabilized alumina.

Hydrocracking operations may be carried out within the same general range of temperature and pressure conditions as prescribed for hydrofining although pressures above about 500 p.s.i.g. are generally preferred. Similar space velocities may also be utilized. Higher temperatures and pressures generally tend to favor hydrocracking, but usually it is preferred to obtain hydrocracking by altering the catalyst so as to provide an acidic cracking component therein. When an acidic catalyst is employed, temperatures as low as about 400° F. may sometimes be used. Hydrocracking catalysts generally comprise a hydrogenating metal, oxide or sulfide (preferably a sulfide) as described above in connection with hydrofining, but the hydrogenating component is generally supported upon a more or less acidic cracking base. Suitable cracking bases include, for example, composites of silica-alumina, silica-magnesia, silica-zirconia, silica-zirconia-titania, and the like. These cracking bases are preferably impregnated with between about 1 percent and 30 percent by weight of hydrogenating component. The metals nickel, cobalt, platinum, rhodium and palladium or the sulfides thereof are preferred hydrogenating components for hydrocracking catalysts. Certain zeolitic molecular sieves may also be employed as hydrocracking catalyst bases.

The preferred cracking bases comprise composites of silica and alumina containing about 50 percent to 90 percent silica; coprecipitated composites of silica, titania and zirconia containing between 5 percent and 75 percent of each component; decationized, zeolitic, crystalline molecular sieves of the Y crystal type, having relatively uniform pore diameters of about 9 to 10 A., and comprising silica and alumina in mole-ratios between about 4:1 and 6:1. Any of these cracking bases may be further promoted by the addition of small amounts, e.g., 1-10 percent by weight, of halides such as fluorine, boron trifluoride, silicon tetrafluoride, etc.

In the liquid-phase treatments of this invention, hydrogen rates are determined from a chemical standpoint merely by the amount required to maintain pressure, and thus to maintain the liquid phase substantially saturated with hydrogen at reactor pressure. These chemical requirements generally lie within the range of about 200 to 2,000 s.c.f. per barrel of liquid feed. However, in addition to the chemical requirements, a sufficient excess amount can be supplied to obtain the desired mechanical agitation to keep the catalyst suitably dispersed.

The following example is cited as illustrative, but is not to be construed as limiting in scope:

Example

An exemplary hydrofining operation is carried out as follows in a 3-zone reactor similar to that illustrated in the drawing, having a total liquid capacity of 2100 gallons (50 barrels).

The illustrative feedstock is a Los Angeles basin topped crude oil having the following properties:

| | |
|---|---|
| Gravity, ° API | 15 |
| Total nitrogen, wt. percent | 0.2 |
| Sulfur, wt. percent | 1.2 |
| Ash, p.p.m. | 450 |
| Boiling range, ° F.: | |
| 0–20% | 500–700 |
| 20–40% | 700–810 |
| 40–100% | >810 |

The catalyst employed is a powdered composite of activated alumina (average particle size 10–20 microns) upon which is impregnated about 3 weight percent of NiO and 15 weight percent of $MoO_3$, the composite being presulfided prior to use.

The feed is preheated to a temperature of about 700° F. and fed into the reactor at autogenous pressure, initially in the absence of hydrogen and catalyst. When the reactor is filled, sufficient hydrogen is introduced through th bottom of the reactor to raise the pressure to about 400 p.s.i.g. About 2500 pounds of powdered catalyst is then added via conduit 30 over a period of about 6 hours with screw conveyor 24 activated and stirrers 36 inactivated. Stirrers 36 are then activated, and the pressure raised to about 800 p.s.i.g. by the introduction of additional hydrogen. Steady-state process conditions are then established as follows:

| | |
|---|---|
| Feed rate, b./hr. | 150 |
| Fresh catalyst addition, lbs./hr. | 12.5 |
| Spent catalyst withdrawal, lbs./hr. | 12.5 |
| $H_2$ rate, s.c.f./b. fresh feed | 2,000 |
| Temperature, ° F. | 700 |
| Pressure, p.s.i.g. | 800 |

The liquid product recovered is found to have a nitrogen content of less than 50 p.p.m., and a sulfur content of less than 20 p.p.m. The ash content is also substantially reduced, to a level below 10 p.p.m. Conversion to material boiling below 500° F. is about 3–5 volume percent.

The operation as described above can be modified to achieve substantial hydrocracking by simply raising the temperature to about 760° F., under which condition about 80% of the liquid product is found to boil below 810° F.

The following claims are believed to define the true scope of the invention.

I claim:

1. A method for the catalytic hydrogenation of a mineral oil feedstock in the liquid phase to provide an essentially countercurrent flow of feed and powdered catalyst, which comprises:
   (a) establishing a series of contacting zones including a feed-inlet contacting zone at one end of said series and a catalyst-inlet contacting zone at the other end of said series, each zone containing an agitated slurry of finely divided hydrogenation catalyst in said liquid feedstock and being maintained at elevated hydrogenation temperatures and pressures;
   (b) substantially continuously injecting hydrogen into each of said zones;
   (c) continuously or intermittently introducing fresh catalyst powder into said catalyst-inlet zone;
   (d) continuously or intermittently conveying a minor separated portion of catalyst from said catalyst-inlet zone into the next adjacent zone toward said feed-inlet zone, and similarly conveying separated catalyst from each of the intermediate zones, if any, to the next adjacent zone until it reaches said feed-inlet zone;
   (e) at least periodically withdrawing increments of relatively spent catalyst from said feed-inlet zone;
   (f) substantially continuously introducing fresh liquid feed to said feed-inlet zone;
   (g) substantially continuously separating suspended catalyst from a minor portion of the slurry in said feed-inlet zone by quiescent settling and transferring the resulting catalyst-free feed portion to the next adjacent contacting zone toward said catalyst-inlet zone, and similarly transferring a separated liquid feed portion from each of the intermediate zones, if any, to the next adjacent zone until the final increment of transferred feed reaches said catalyst-inlet zone; and
   (h) withdrawing hydrogenated, catalyst-free liquid product from said catalyst-inlet zone.

2. A method according to claim 1 wherein said feedstock comprises a substantial proportion of undistilled crude oil residuum.

3. A method according to claim 1 wherein said transfer of catalyst-free feed portions in step (g) is effected hydrodynamically in response to said introduction of fresh feed in step (f); and wherein said conveying of separated catalyst portions in step (d) is effected by externally driven mechanical means.

4. The method of claim 1 wherein said hydrogenation is a hydrofining operation carried out at between about 500°–800° F. in the presence of a hydrofining catalyst comprising a composite of an iron group metal sulfide and a Group VI–B metal sulfide.

5. The method of claim 1 wherein said hydrogenation is a hydrocracking operation carried out in the presence of a hydrocracking catalyst comprising (1) an acidic cracking base, and (2) a hydrogenation component selected from the class consisting of the Group VI–B and Group VIII metals and their oxides and sulfides.

6. A method for the catalytic hydrogenation of a mineral oil feedstock in the liquid phase to provide an essentially countercurrent flow of feed and powdered catalyst, which comprises:
   (a) establishing a series of horizontally juxtaposed contacting zones including a feed-inlet contacting zone at one end of said series and a catalyst-inlet contacting zone at the other end of said series, each zone containing an agitated slurry of finely divided hydrogenation catalyst in said liquid feedstock and being maintained at elevated hydrogenation temperatures and pressures;
   (b) substantially continuously bubbling hydrogen upwardly through each of said zones and removing overhead a combined vapor phase effluent from said zones;
   (c) continuously or intermittently introducing fresh catalyst powder into said catalyst-inlet zone;
   (d) continuously or intermittently conveying a minor settled portion of catalyst from a relatively quiescent lower portion of said catalyst-inlet zone into the next adjacent zone toward said feed-inlet zone, and similarly conveying settled catalyst from each of the intermediate zones, if any, to the next adjacent zone until it reaches said feed-inlet zone;
   (e) at least periodically withdrawing increments of settled, relatively spent catalyst from a relatively quiescent lower portion of said feed-inlet zone;
   (f) substantially continuously introducing fresh liquid feed to said feed-inlet zone;
   (g) substantially continuously separating suspended catalyst from a minor portion of the feed in a relatively quiescent upper portion of said feed-inlet zone and returning the separated catalyst to the major agitated portion thereof while transferring the resulting catalyst-free feed portion to the next adjacent contacting zone toward said catalyst-inlet zone, and similarly transferring a separated liquid feed portion from each of the intermediate zones, if any, to the next adjacent zone until the final increment of transferred feed reaches said catalyst-inlet zone; and
   (h) withdrawing hydrogenated, catalyst-free liquid product from said catalyst-inlet zone.

7. A method according to claim 6 wherein said feedstock comprises a substantial proportion of undistilled crude oil residuum.

8. A method according to claim 6 wherein said transfer of catalyst-free feed portions in step (g) is effected hydrodynamically in response to said introduction of fresh feed in step (f); and wherein said conveying of separated catalyst portions in step (d) is effected by externally driven mechanical means.

9. The method of claim 6 wherein said hydrogenation is a hydrofining operation carried out at between about 500°–850° F. in the presence of a hydrofining catalyst comprising a composite of an iron group metal sulfide and a Group VI–B metal sulfide.

10. The method of claim 6 wherein said hydrogenation is a hydrocracking operation carried out in the presence of a hydrocracking catalyst comprising (1) an acidic cracking base, and (2) a hydrogenation component selected from the class consisting of the Group VI–B and Group VIII metals and their oxides and sulfides.

References Cited

UNITED STATES PATENTS

| | | | |
|---|---|---|---|
| 2,517,339 | 7/1950 | Offutt et al. | 196—52 |
| 3,144,404 | 7/1964 | Tyson | 208—264 |

DELBERT E. GANTZ, Primary Examiner

T. H. YOUNG, Assistant Examiner

U.S. Cl. X.R.

208—155, 157, 210